US012618505B2

(12) United States Patent
Moncarz et al.

(10) Patent No.: US 12,618,505 B2
(45) Date of Patent: May 5, 2026

(54) INSULATED WELDED JOINT FOR PIPE-IN-PIPE SYSTEMS

(71) Applicant: XGS Energy, Inc., Palo Alto, CA (US)

(72) Inventors: Piotr D. Moncarz, Palo Alto, CA (US); Mark McGilvray, Jr., Katy, TX (US); Henryk Man, Haifa (IL)

(73) Assignee: XGS Energy Inc., Palo Alto, CA (US)

( * ) Notice: Subject to any disclaimer, the term of this patent is extended or adjusted under 35 U.S.C. 154(b) by 96 days.

(21) Appl. No.: 18/293,721

(22) PCT Filed: Jul. 27, 2022

(86) PCT No.: PCT/US2022/038572
§ 371 (c)(1),
(2) Date: Jan. 30, 2024

(87) PCT Pub. No.: WO2023/014560
PCT Pub. Date: Feb. 9, 2023

(65) Prior Publication Data
US 2024/0344649 A1 Oct. 17, 2024

Related U.S. Application Data

(60) Provisional application No. 63/228,301, filed on Aug. 2, 2021.

(51) Int. Cl.
*F16L 59/20* (2006.01)
*F16L 13/02* (2006.01)
*F24T 50/00* (2018.01)

(52) U.S. Cl.
CPC ........... *F16L 59/20* (2013.01); *F16L 13/0218* (2013.01); *F24T 50/00* (2018.05)

(58) Field of Classification Search
CPC ..... F16L 59/20; F16L 13/0218; F16L 39/005; F24T 50/00
See application file for complete search history.

(56) References Cited

U.S. PATENT DOCUMENTS 827,437 A 7/1906 Giles
860,772 A 7/1907 Taylor et al.
(Continued)

FOREIGN PATENT DOCUMENTS

CN 210267786 U 4/2020
FR 2761449 A1 10/1998
(Continued)

OTHER PUBLICATIONS

Translation of JP Office Action dated Sep. 3, 2024.
(Continued)

*Primary Examiner* — Hoang M Nguyen
(74) *Attorney, Agent, or Firm* — Martin Fessenmaier; Umberg Zipser LLP

(57) ABSTRACT

An insulated joint in a pipe-in-pipe system comprises a weld that connects two inner pipes while respective outer pipes circumferentially enclose the inner pipes and terminate at a position distal from the weld. Respective rings are coupled to the inner pipes at the distal position and the outer pipes are welded to the rings. A joint insulation material covers the weld, and a sleeve segment covers the weld and joint insulation material. Preferably, the sleeve segment is formed from two half-pipe sleeve portions and welded to the rings to so secure the sleeve segment to the joined pipe-in-pipe segments. Contemplated pipe-in-pipe systems have significantly reduced thermal loss and provide strength sufficient for a pipe laying process that includes pipe bending and pipe straightening.

20 Claims, 4 Drawing Sheets

(56) References Cited

U.S. PATENT DOCUMENTS

| 3,058,909 | A | | 10/1962 | Kern |
| 3,163,219 | A | | 12/1964 | Wyant et al. |
| 4,162,093 | A | | 7/1979 | Sigmund |
| 4,219,224 | A | | 8/1980 | Hanley |
| 6,000,438 | A | * | 12/1999 | Ohrn ..................... F16L 59/143 |
| | | | | 138/155 |
| 6,251,179 | B1 | | 6/2001 | Allan |
| 6,668,554 | B1 | | 12/2003 | Brown |
| 6,672,371 | B1 | | 1/2004 | Amerman et al. |
| 7,067,004 | B2 | | 6/2006 | Matula et al. |
| 7,452,417 | B2 | | 11/2008 | Matula et al. |
| 8,584,753 | B2 | | 11/2013 | Fitzpatrick et al. |
| 8,616,000 | B2 | | 12/2013 | Parrella |
| 8,998,267 | B2 | | 4/2015 | Prescott et al. |
| 9,091,460 | B2 | | 7/2015 | Parrella, Sr. |
| 9,845,423 | B2 | | 12/2017 | Frantz et al. |
| 9,857,011 | B2 | * | 1/2018 | Mair ..................... F16L 59/20 |
| 10,113,106 | B2 | | 10/2018 | Wadekar |
| 10,954,924 | B2 | | 3/2021 | Moncarz et al. |
| 11,085,671 | B2 | | 8/2021 | Gheysens |
| 11,125,471 | B2 | | 9/2021 | Marsh et al. |
| 11,299,970 | B2 | | 4/2022 | Cook |
| 11,656,002 | B2 | | 5/2023 | Nevison et al. |
| 2003/0187583 | A1 | | 10/2003 | Martin et al. |
| 2005/0212285 | A1 | | 9/2005 | Haun |
| 2006/0210631 | A1 | | 9/2006 | Patel et al. |
| 2007/0125274 | A1 | | 6/2007 | Miller |
| 2007/0163805 | A1 | | 7/2007 | Trevisani |
| 2008/0223041 | A1 | | 9/2008 | Reynolds |
| 2009/0211757 | A1 | | 8/2009 | Riley |
| 2010/0171301 | A1 | | 7/2010 | Tierling |
| 2011/0232858 | A1 | | 9/2011 | Hara |
| 2012/0247766 | A1 | | 10/2012 | Hemmings |
| 2014/0375049 | A1 | | 12/2014 | Mair et al. |
| 2015/0276113 | A1 | | 10/2015 | Bass et al. |
| 2016/0084051 | A1 | * | 3/2016 | Vinegar ................. C09K 8/845 |
| | | | | 166/302 |
| 2020/0191444 | A1 | | 6/2020 | Nevison et al. |
| 2020/0316876 | A1 | * | 10/2020 | Fatica .............. B29C 66/53241 |
| 2021/0071063 | A1 | | 3/2021 | Stone |
| 2021/0348804 | A1 | | 11/2021 | Marsh et al. |
| 2021/0356174 | A1 | | 11/2021 | Alharbi et al. |
| 2024/0228868 | A1 | | 7/2024 | Werries et al. |

FOREIGN PATENT DOCUMENTS

| JP | 2016008663 | A | 1/2016 |
| WO | 2005119150 | A2 | 12/2005 |
| WO | 2014092940 | A1 | 6/2014 |
| WO | 2022018674 | A1 | 1/2022 |
| WO | 2024044251 | A1 | 2/2024 |

OTHER PUBLICATIONS

CN21067786U Machine Translation (English).
FR2761449 Machine Translation (English).
Translation of TW Office Action dated Sep. 11, 2023.

* cited by examiner

INSULATED WELDED JOINT FOR PIPE-IN-PIPE SYSTEMS

This application claims priority to our U.S. Provisional patent application with the Ser. No. 63/228,301, which was filed Aug. 2, 2021, and which is incorporated by reference herein.

FIELD OF THE INVENTION

The field of the invention is devices and methods for joining insulated pipe-in-pipe systems.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There are numerous manners of joining pipes known in the art such as use of threads, flanges, or welds. In many cases, however, conventional pipe connections will not be suitable where the pipe is an insulated pipe-in-pipe system in which an inner pipe is disposed within an outer pipe, and in which the space between the pipes must be insulated to avoid heat or cold loss. To allow for joining such pipe-in-pipe systems, each insulated pipe-in-pipe segment can be capped at the ends of the insulated space to so enclose an annular insulated space, and the respective capped ends can then be connected together via welds or a sleeve. While such connections are relatively simple to implement in the field, numerous drawbacks remain. Most significantly, the end caps at the annular insulated space will form a conductive heat transfer path that will lead to significant heat or cold loss. Such loss is particularly undesirable where the pipe-in-pipe system has a significant length and as such requires a relatively large number of connections.

In an attempt to reduce thermal loss and thermal stress, a bulkhead can be employed between two pipe-in-pipe segments as is described in U.S. Pat. No. 8,998,267. Here, the bulkhead in a cryogenic pipe-in-pipe system has an inner transition element, and distinct first and second outer transition elements that are coupled to and at least partially surround the inner transition element. The bulkhead can then be welded to respective ends of inner and outer pipelines of adjoining pipe-in-pipe segments. Such system advantageously reduces heat transfer paths and as such reduces heat or cold loss. Moreover, thermal stresses (e.g., due to contraction upon receiving a cryogenic liquid) can be transferred from the inner to the outer pipe. However, due to the relatively complex configuration, a relatively large number of welds and welding steps are required and therefore require significant time for assembly and expense.

In addition, pipe-in-pipe systems with capped insulated annular space or bulkheads will also be prone to mechanical failure where the pipe-in-pipe system is subject to significant mechanical forces, and particularly forces as will be encountered with pipe laying that requires pipe bending and pipe straightening steps.

Thus, even though various systems and methods of insulated pipe-in-pipe systems are known in the art, all or almost all of them suffer from several drawbacks. Therefore, there remains a need for compositions and methods for improved insulated pipe-in-pipe systems, and especially systems that allow for simple assembly, that can withstand significant bending and straightening forces, and that minimize thermal loss across joints between pipe-in-pipe segments.

SUMMARY OF THE INVENTION

The inventive subject matter is directed to various insulated pipe-in-pipe systems and methods in which inner and outer pipes of a pipe-in-pipe segment are coupled to each other by a ring that is coupled to the outer surface of the inner pipe. Most typically, the outer pipe is recessed from the inner pipe and terminates at the ring, and once respective ends of the inner pipes of two pipe-in-pipe segments are welded together, a sleeve segment is formed and coupled to the rings after coupling a joint insulation material to the weld joint, thereby enhancing mechanical strength of the joint while minimizing thermal conductivity.

In one aspect of the inventive subject matter, the inventors contemplate an insulated joint in a pipe-in-pipe system that comprises a first pipe-in-pipe segment and a second pipe-in-pipe segment, with each pipe-in-pipe segment having an outer pipe enclosing an inner pipe, and each pipe-in-pipe segment having insulation material in an annular space between the outer pipe and the inner pipe. Furthermore, each pipe-in-pipe segment has a ring between the outer and inner pipe at which the outer pipe terminates and to which the outer pipe is coupled, and to which the inner pipe is coupled and beyond which the inner pipe extends. A weld joint joins respective ends of the inner pipes of the first and second pipe-in-pipe segments, and first and second half-pipe sleeves are coupled to each other via longitudinal welds to form a sleeve segment. The sleeve segment is welded to the rings of the first and second pipe-in-pipe segments such that (a) the welds at the rings connect the outer pipes of the first and second pipe-in-pipe segments via the sleeve, and (b) the welds at the rings connect the outer pipes of the first and second pipe-in-pipe segments to the respective inner pipes of the first and pipe-in-pipe segments via the rings. Finally, a joint insulation material is disposed between the rings of the first and second pipe-in-pipe segments and between the weld joint and the sleeve.

In some embodiments, each of the pipe-in-pipe segments will have a length of about 10-20 m, the inner pipe of the first and second pipe-in-pipe segments may have a diameter of about 10-20 cm, the outer pipe of the first and second pipe-in-pipe segments may have a diameter of about 15-25 cm, and/or the sleeve segment may have a length of about 20-50 cm.

With respect to the ring, it is contemplated that the ring may have a radial width of about 3-10 cm and a thickness of about 2-5 cm. Therefore, it is contemplated that the distance between the inner pipe and the outer pipe may be the same as a radial width of the ring. Most typically, the ring is welded to the inner pipe in each of the first and second pipe-in-pipe segments.

In further embodiments, the first and/or the second half-pipe sleeve may comprise a backer bar (on the inside of the half-pipe) along the longitudinal welds. Additionally, it is contemplated that the sleeve segment and the outer pipes of the first and second pipe-in-pipe segments may have the same outer diameter. Preferably, the joint insulation material is wrapped around the weld joint, and it is especially preferred that the welds, the ring, and the sleeve segment of the joined pipe-in-pipe segments will have a strength sufficient for a pipe laying process that includes pipe bending and pipe straightening.

Consequently, the inventors also contemplate a method of joining a first pipe-in-pipe segment to a second pipe-in-pipe segment where each pipe-in-pipe segment has an outer pipe enclosing an inner pipe that extends beyond the outer pipe, and where each pipe-in-pipe segment has insulation material in an annular space between the outer pipe and the inner pipe. Such method will typically include a step of forming a weld joint between respective ends of the inner pipes of the first and second pipe-in-pipe segments, and a further step of covering the weld joint with joint insulation material. In another step, first and second half-pipe sleeves are welded together via longitudinal welds to form a sleeve segment above the weld joint, and the sleeve segment is then welded to respective rings on the first and second pipe-in-pipe segments such that (a) the welds at the rings connect the outer pipes of the first and second pipe-in-pipe segments via the sleeve, and (b) the welds at the rings connect the outer pipes of the first and second pipe-in-pipe segments to the respective inner pipes of the first and second pipe-in-pipe segments via the rings.

Preferably, but not necessarily, the weld joint is covered by wrapping the joint insulation material about the weld joint. Moreover, it is typically preferred that the first and second half-pipe sleeves comprise a backer bar along the longitudinal welds, and/or that the respective rings on the first and second pipe-in-pipe segments are welded to the inner pipe of the first and second pipe-in-pipe segments. Additionally, it is preferred that the sleeve segment and the outer pipes of the first and second pipe-in-pipe segments have the same outer diameter, and/or that the sleeve segment and the outer pipes of the first and second pipe-in-pipe segments share a common weld at the respective rings.

In some examples, at least 20 pipe-in-pipe segments are serially joined, and each of the pipe-in-pipe segments may have a length of about 10-20 m, and each sleeve segment may have a length of about 20-50 cm. In further examples, the inner pipe of the first and second pipe-in-pipe segments may have a diameter of about 10-20 cm and the outer pipe of the first and second pipe-in-pipe segments may have a diameter of about 15-25 cm. Most preferably, the welds, the ring, and the sleeve segment of the joined pipe-in-pipe segments will have a strength sufficient for a pipe laying process that includes pipe bending and pipe straightening.

Therefore, in one exemplary use of contemplated methods, the inventors contemplate a method of installing an insulated return pipe in a geo heat recovery plant that includes a step of providing a plurality of pipe-in-pipe segments, each having an outer pipe enclosing an inner pipe, and each pipe-in-pipe segment having insulation material in an annular space between the outer pipe and the inner pipe. In another step, the pipe-in-pipe segments are welded together while being in a horizontal orientation to each other such that (1) respective ends of the inner pipes are welded to each other; (2) respective ends of the outer pipes are welded to respective rings on the inner pipes of the pipe segments; and (3) a sleeve segment is placed between and welded to the rings of the pipe segments and further welded to the respective ends of the outer pipes to thereby form a continuous outer pipe enclosing the weld connecting the inner pipes. In yet another step, the joined pipe-in-pipe segments are advanced downhole into a geological formation from the horizontal orientation to a vertical orientation using a bending device and a straightening device.

In such methods, each of the pipe-in-pipe segments may have a length of about 10-20 m, the inner pipe of the first and second pipe-in-pipe segments may have a diameter of about 10-20 cm, the outer pipe of the first and second pipe-in-pipe segments may have a diameter of about 15-25 cm, and/or the sleeve segment may have a length of about 20-50 cm. Most typically, the ring in such examples will have a radial width of about 3-10 cm and a thickness of about 2-5 cm. In some embodiments, the joined pipe-in-pipe segments are advanced into a casing in the formation, and/or the geological formation is at a depth of at least 500 m.

Most preferably, the flexion forces during bending and straightening are transferred from the outer pipe to the inner pipe via the ring. It is further contemplated that the rings will be spaced apart at a distance that prevents compression of the insulation material in the annular space due to reduction of the annular space. Moreover, it is typically preferred that the inner pipe in each of the pipe-in-pipe segments will have a strength sufficient to convey a fluid at a pressure of at least 2,000 psi and a temperature of at least 200° C.

Consequently, the inventors also contemplate a geo heat recovery plant that includes a casing in a geological formation, wherein the casing encloses a pipe-in-pipe system comprising a plurality of serially joined pipe-in-pipe segments, each having an outer pipe enclosing an inner pipe, and each pipe-in-pipe segment having insulation material in an annular space between the outer pipe and the inner pipe. Most preferably, the pipe-in-pipe segments will be coupled to each other such that (1) respective ends of the inner pipes are welded to each other; (2) respective ends of the outer pipes are welded to respective rings on the inner pipes of the pipe segments; and (3) a sleeve segment is placed between and welded to the rings of the pipe-in-pipe segments and further welded to the respective ends of the outer pipes to thereby form a continuous outer pipe enclosing the weld connecting the inner pipes. Most typically, the casing and the pipe-in-pipe system are fluidly coupled to each other and a heat exchanger to so form a closed loop working fluid circuit for heat recovery and power generation.

Among other suitable choices, the geological formation may be at a depth of at least 500 m and/or may have a formation temperature of at least at least 200° C. In some embodiments, the serially joined pipe-in-pipe segments will have a length of at least 1,000 m. Preferably, the closed loop working fluid circuit is thermally coupled to an electric generator.

Various objects, features, aspects, and advantages of the inventive subject matter will become more apparent from the following detailed description of preferred embodiments, along with the accompanying drawing figures in which like numerals represent like components.

DETAILED DESCRIPTION

The inventors have discovered various pipe-in-pipe systems and methods of coupling multiple pipe-in-pipe segments such that the resulting pipe-in-pipe system has reduced thermal loss across joints connecting the pipe-in-pipe segments, and such that the pipe-in-pipe system has sufficient mechanical strength/resilience to allow bending and straightening operations to so facilitate on-site fabrication in a substantially horizontal orientation and deployment of the pipe-in-pipe system into a geo heat well in a substantially vertical orientation.

In one exemplary embodiment, a pipe-in-pipe system is constructed form a plurality of pipe-in-pipe segments, each segment having an outer pipe that encloses an inner pipe, and each segment containing insulation material in an annular space between the outer pipe and the inner pipe. A ring is disposed between the inner and outer pipe, typically by welding the ring to the outer surface of the inner pipe. Preferably, but not necessarily, the ring has a width that allows welding of the outer pipe to one portion of the ring while another portion of the ring can be used to weld a sleeve to the ring and/or outer pipe. During construction, which is commonly done in a generally horizontal orientation on site (i.e., in proximity to a vertical well into which the nascent pipe-in-pipe system is advanced), the inner pipe of one pipe-in-pipe segment is welded to the inner pipe of another pipe-in-pipe segment. Once the weld joint between respective ends of the inner pipes of the first and second pipe-in-pipe segments is completed, a joint insulation material is applied (e.g., as a wrap from a sheet stock) between the rings of the first and second pipe-in-pipe segments such as to cover the weld joint, and preferably most or all of the space between the rings of the first and second pipe-in-pipe segments. In such embodiment, the gap between the recessed outer pipes terminating at the respective rings is then covered by a sleeve that is preferably formed from two half-pipe sleeves. As will be readily appreciated, the two half-pipe sleeves will be welded together and to the ring to so complete the insulated joint in the pipe-in-pipe system.

Figure 1:
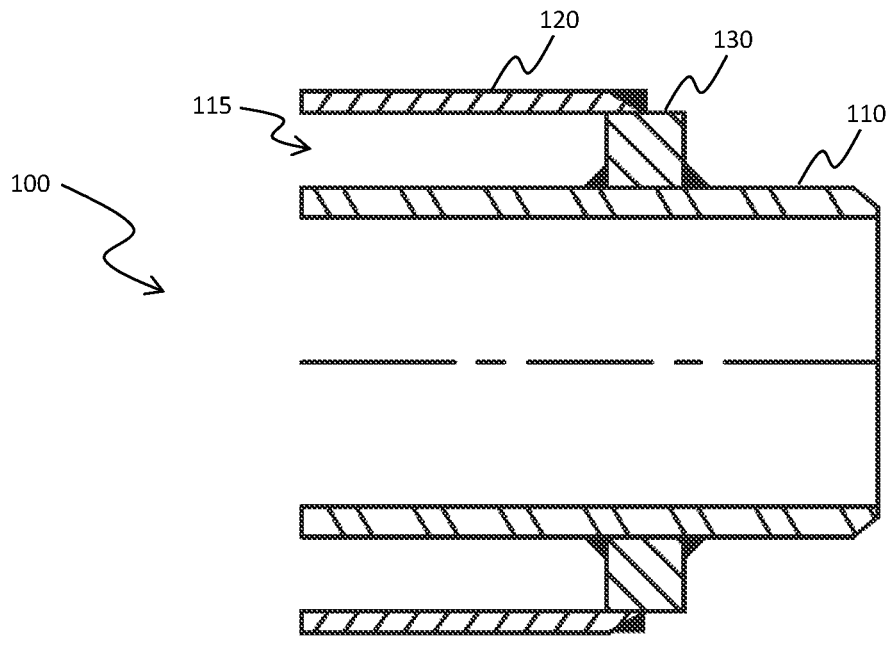
FIG. 1 is an exemplary schematic longitudinal cross section of a pipe-in-pipe segment according to the inventive subject matter.
Figure 2:
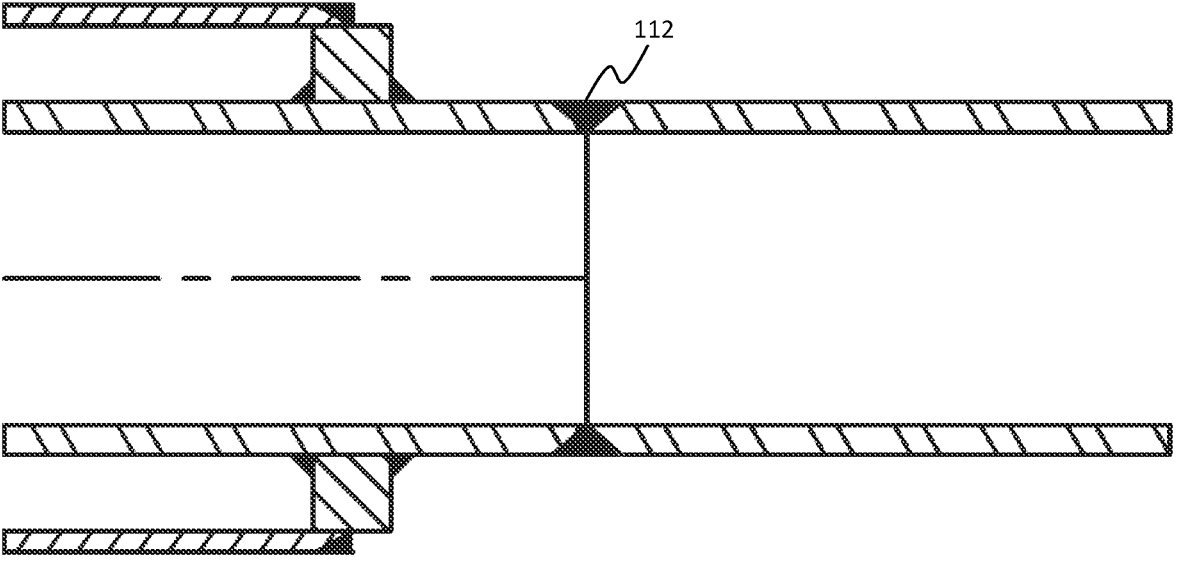
FIG. 2 is an exemplary schematic longitudinal cross section of a first pipe-in-pipe segment according to the inventive subject matter welded at the inner pipes to a second pipe-in-pipe segment (ring and outer pipe not shown for second segment).
Figure 3:
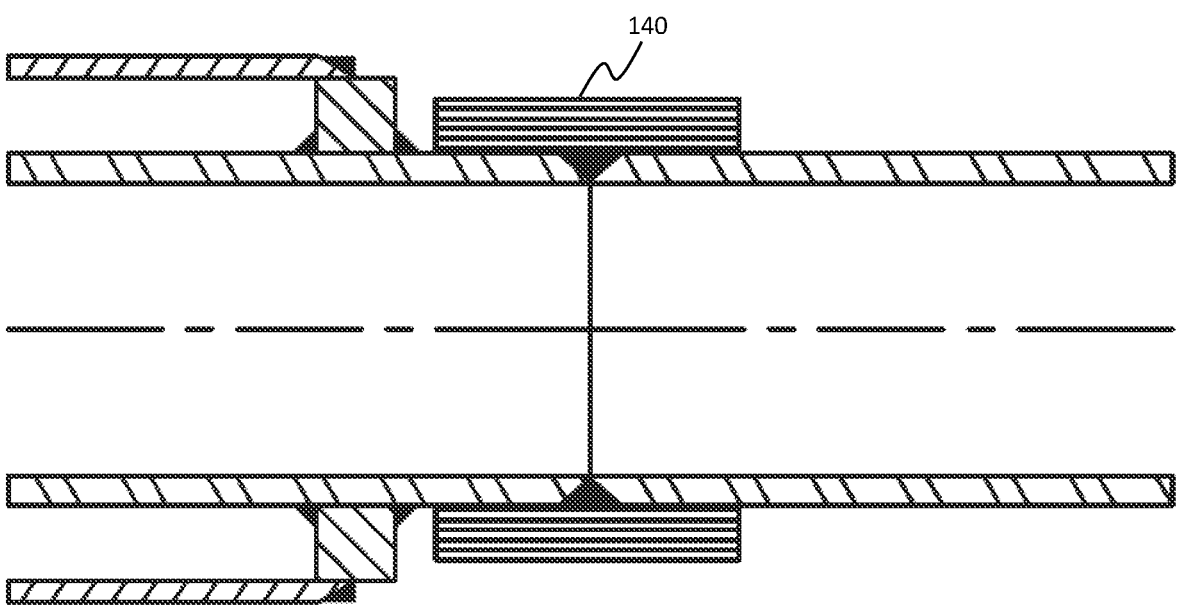
FIG. 3 is an exemplary schematic longitudinal cross section of the joined segments of FIG. 2 with joint insulation material.
Figure 4:
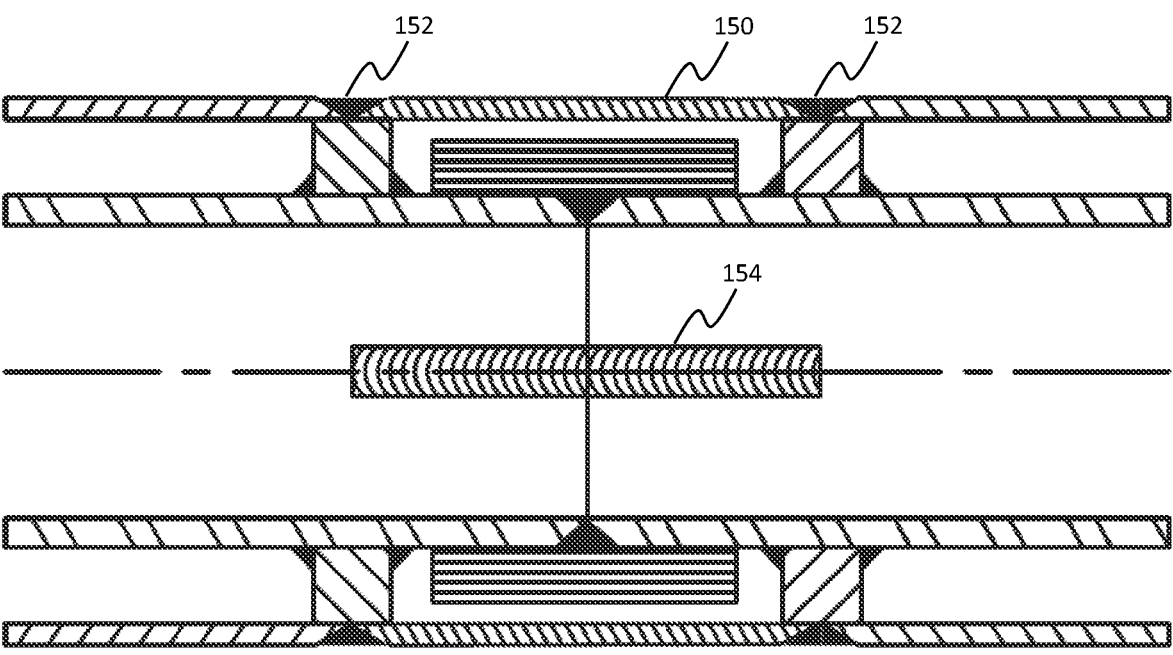
FIG. 4 is an exemplary schematic longitudinal cross section of two joined pipe-in-pipe segments with joint insulation material and sleeve segment welded to the rings according to the inventive subject matter.

FIG. 1 exemplarily depicts a terminal portion of a longitudinal cross section of a pipe-in-pipe segment 100 having an inner pipe 110 and an outer pipe 120. A ring 130 is welded to the outer surface of the inner pipe 110, and the outer pipe 120 rests on a portion of the ring. Where desired, the terminal portion of the outer pipe 120 can be welded to the ring. The annular space 115 between the outer and inner pipe ring. The annular space 115 contains insulation material (not shown). During assembly of the pipe-in-pipe system, the ends of two inner pipes of respective pipe-in-pipe segments are placed next to each other and welded together at weld joint 112 as shown in FIG. 2 (outer pipe and ring of the second pipe-in-pipe segment not shown). Joint insulation material 140 is then applied to the weld in the space between the rings as is shown in FIG. 3, and the weld joint and joint insulation material are covered by sleeve 150 that is formed from two half-pipe sleeves. In the example of FIG. 4, the respective ends of the sleeve are welded to the respective rings. Here, the welds 152 connect the sleeve to the rings and further connects the ends of the sleeve to the respective ends of the outer pipes in the pipe-in-pipe segments. Welds 154 connect the two half-pipe sleeves. Such connection is especially advantageous as loads can be transferred between outer and inner pipes via the ring and between the outer pipes via the ring and the sleeve.

Figure 5:
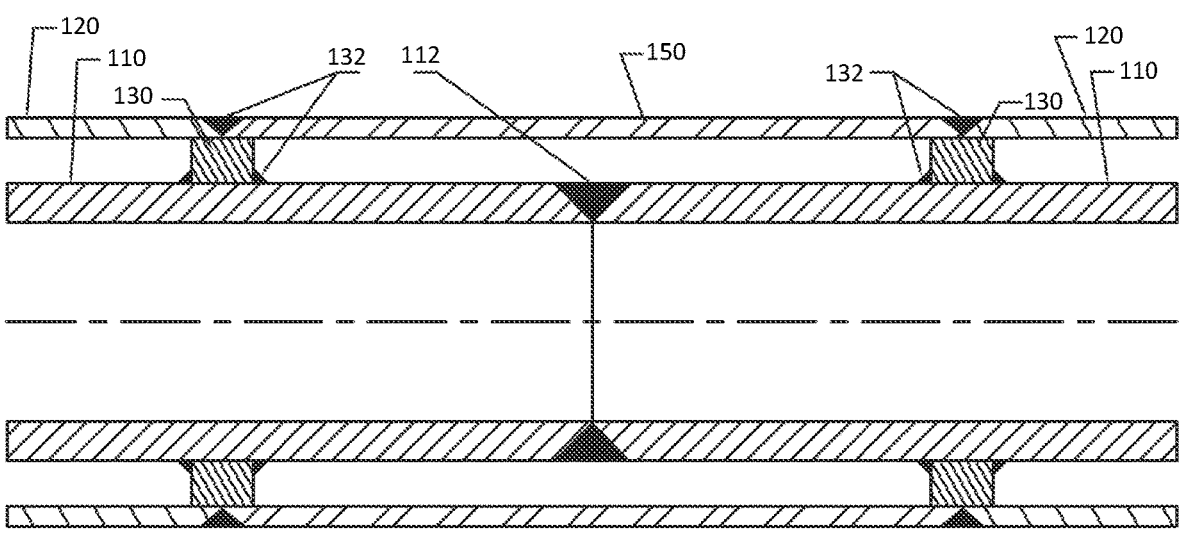
FIG. 5 is an exemplary schematic longitudinal cross section of two joined pipe-in-pipe segments and sleeve segment welded to the rings according to the inventive subject matter (joint insulation material not shown).
Figure 6:
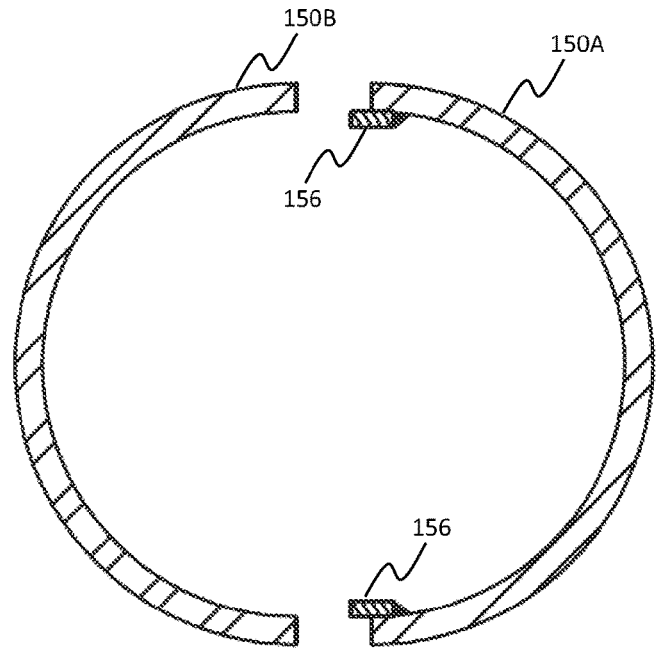
FIG. 6 is an exemplary schematic cross section of two half-pipe sleeves with one sleeve having backer bars.

FIG. 5 is another exemplary view of an insulated joint in a pipe-in-pipe system. As can be seen, joint weld 112 connects the inner pipes while outer pipes 120 terminate a rings 130 that are welded by ring welds 132 to the outer surface to the inner pipe. Ring welds 132 also connect the ends of the sleeve 150 to the outer pipes. Insulation material in the annular space and joint insulation material covering the joint weld are not shown. FIG. 6 depicts exemplarily the first and second half-pipe sleeves, which may further include backer bars 156. Once the half-pipe sleeves are placed around the weld joint, the half-pipe sleeves can be welded together in longitudinal direction along the back bars 156 (see weld 154 in FIG. 4) to form a sleeve, which can then be welded to the rings and ends of the outer pipes (see welds 152 in FIG. 4). Thus, it should be noted that the outer surfaces of the sleeve and the outer pipe will be on the same level and continuous and as such greatly facilitate advancing the pipe-in-pipe system through tensioners, bending and straightening devices.

Figure 7:
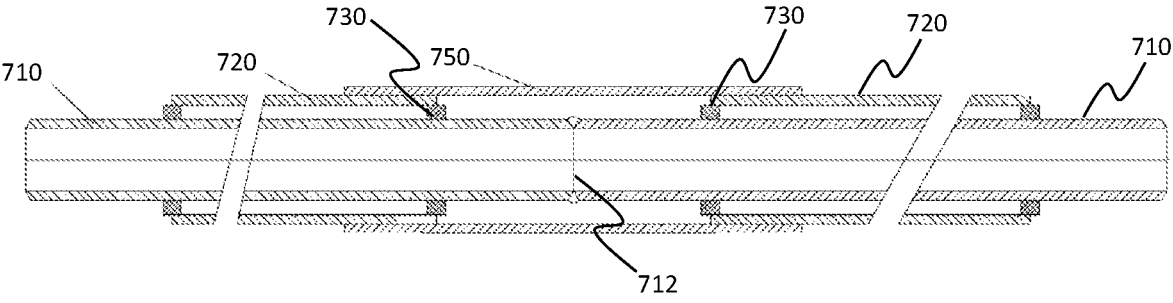
FIG. 7 is an exemplary schematic longitudinal cross section of an alternate assembly of two joined pipe-in-pipe segments with a sleeve segment according to the inventive subject matter.

However, in alternative embodiments as shown in FIG. 7, one or more sleeves may also be configured as a sleeve 750 that is circumferentially positioned over the weld joint 712 that connects the inner pipes 710, joint insulation material (not shown), and rings 730 such that the inner surface of the sleeve is adjacent to the outer surface of the outer pipe 720. In such case, the rings are only coupled (typically welded) to the inner and outer pipes and will not be welded to the sleeve. As will be readily appreciated, such sleeve can be fabricated from half-pipes as noted above or can be deployed as closed pipe segment that slidingly engages with the outer pipes. Using such 'external' sleeve will advantageously simplify and speed up assembly. Moreover, such assembly will also allow for some telescoping/articulation, which will enhance the flexibility that is required for bending and straightening operations. Where desired, the sleeve is welded to the outer pipe, or may be coupled to the outer pipe by use of friction, friction materials or friction structures between the sleeve and the outer pipe.

It should therefore be appreciated that the systems and methods presented herein will provide various benefits and advantages. Among other things, it should be appreciated that the rings will support significant tension and compression loads, and especially where the loads are generated during bending and installation of the insulated pipe-in-pipe systems as the rings and sleeve enable load sharing between inner and outer pipes. In that context, it should be noted that the bending and straightening forces (leading to plastic deformation) are applied primarily to the outer pipe, which are then transferred through the support rings to the inner pipe. Such improvements in stability/resilience will also allow for thinner walls for the inner and outer pipes as compared to conventional designs, which will advantageously reduce overall weigh. Such reduced weight is especially desirable where the pipe-in-pipe systems have a considerable length, and less weight. Moreover, the systems and methods presented herein will also significantly reduce, and more typically eliminate buckling of the outer pipe, which would lead to loss in stability and structural integrity as well as compression of the insulation material in the annular space and/or the space above the weld joint.

With respect to the pipe-in-pipe segments presented herein, it is contemplated that the specific configurations and dimensions of the pipe-in-pipe segments may vary considerably, and the specific configuration and dimension will typically be determined by the particular use and environmental parameters. However, especially preferred pipe-in-pipe segments will include those that are used as return pipes in a geo heat recovery/harvesting operation where a large number of pipe-in-pipe segments are connected (welded) together at the site of deployment into a well. Therefore, contemplated pipe-in-pipe segments will typically have a length of between 5-20 m or between 20-40 m, and even longer, such as for example, between 7-15 m or between 10-20 m, or between 20-30 m, or between 30-40 m, and even longer.

With respect to the outer diameters of the inner and outer pipes it is contemplated that as the inner pipe is enclosed within the outer pipe, the inner pipe will have a smaller outer diameter than the outer pipe. Moreover, as the pipe-in-pipe assembly will also contain an insulating material, the difference in diameter should also account for the presence of the insulating material in the annular space. For example, suitable outer diameters of the inner pipe include those of at least 7 cm, or at least 9 cm, or at least 11 cm, or at least 13 cm, or at least 15 cm, or at least 20 cm, and even more, while suitable outer diameters of the outer pipe include those of at least 10 cm, or at least 12 cm, or at least 14 cm, or at least 16 cm, or at least 18 cm, or at least 20 cm, or at least 25 cm, and even more. Therefore, the distance between the walls of the inner pipe and the outer pipe in the annular space may be between 1-5 cm, such as for example, 1.0-2.0 cm, or between 2.0-3.0 cm, or between 3.0-4.0 cm, or between 4.0-5.0 cm, and even more.

Most typically, the thickness of the wall materials in the inner and outer pipes will be constant. For example, the wall thickness of the inner pipe may be between 0.2-2.0 cm, and more typically between about 0.2-0.5 cm, or between 0.5-0.75 cm, 0.75-1.0 cm, and more typically between 1.0-1.5 cm, or between 1.5-2.0 cm, or even thicker. As the outer pipe will be less exposed to pressure of the heated working fluid, the wall thickness will generally be less than the wall thickness of the inner pipe. Therefore, a typical wall thickness of the outer pipe will be between about 0.1-1.5 cm, and more typically between about 0.1-0.25 cm, or between 0.25-0.40 cm, or between 0.40-0.65 cm, and more typically between 0.5-0.8 cm, or between 0.65-1.0 cm, or even thicker.

As should be readily appreciated, the materials of the inner and outer pipes are preferably chosen such as to withstand the significant temperatures and pressures typically present in geo heat harvesting. Therefore, the materials of the inner and outer pipe may vary considerably, and the appropriate choice of material will be readily apparent to the person of ordinary skill in the art in view of the intended purpose. For example, suitable materials include various metals and metal alloys, polymers, and all reasonable combinations thereof. However, and especially where the inner pipe conveys a working fluid in liquid and/or vapor phase at elevated pressure temperature, it is preferred that the materials for the inner and outer pipes comprise iron, and especially a steel (e.g., mild carbon steel or alloy thereof). Among other parameters, the material will be selected such that the working fluid in the inner and outer pipes may have a pressure of at least 500 psig, or at least 1,000 psig, or at least 1,500 psig, or at least 2,000 psig, or at least 2,500 psig, or at least 3,000 psig, or at least 4,000 psig, or at least 5,000 psig, and even higher. Similarly, the material will be selected such that the working fluid in the tubular pipe may have a temperature of at least 30° C., or at least 50° C., or at least 80° C., or at least 100° C., or at least 150° C., or at least 200° C., or at least 250° C., or at least 300° C., or at least 350° C., or at least 400° C., and even higher.

In this context, and particularly where the pipe-in-pipe system is used in geo heat applications, the length of the finished and deployed pipe-in-pipe system may be at least 500 meters, or at least 1,000 meters, or at least 2,000 meters, or at least 3,000 meters, or at least 4,000 meters, or at least 5,000 meters, or at least 6,000 meters, or even longer. Consequently, steel pipes are particularly preferred, and especially higher grade steel that has relatively high tensile strength and yield. For example, suitable steels include P110 grade steel materials and those with similar physical characteristics. As will be readily appreciated, welding will follow generally known protocols for the materials used.

With respect to the rings used in the systems and methods presented herein it should be appreciated that the rings perform several significant functions. Among other things, it should be appreciated that the rings significantly reduce thermal conduction (and with that heat loss) between the inner and outer pipes, and that the rings provide for a mechanism along which even substantial flexural forces can be transmitted. To that end, it is contemplated that the material for the rings will preferably be a medium carbon low-alloy steel having significant strength, toughness, with excellent weldability and corrosion resistance. For example, suitable ring materials includes 4130 and 4140 steel.

In further embodiments, it is contemplated that the rings function as a primary support to the connecting sleeve once welded to the outer and inner pipes, and that the rings once welded to the inner and outer pipes and sleeve allow for transmission of flexural forces. As such, the rings must have a minimum size to accommodate these functions. However, due to their coupling to the inner pipe, the rings will also provide some limited convective heat transfer as heat travels from the inner to outer pipe through the ring. Accordingly, the determined thickness of the ring contributes to the overall heat transfer since there is a direct heat conduction path from hot inner fluid to cold outer fluid, and it is generally preferred to minimize the contact surface to the inner conduit while maintaining its mechanical function. Thus, depending on the particular size of the inner and outer pipes, the dimensions of the ring may vary to at least some degree.

For example, suitable rings will have a thickness of between 1.0-1.5 cm, or between 1.5-2.0 cm, or between 2.5-3.0 cm, or between 3.0-3.5 cm, or between 3.5-4.0 cm, or between 4.0-4.5 cm, or between 4.5-5.0 cm, and even thicker. Similarly, and depending on the dimensions of the inner and outer pipes, the rings may have a radial width (i.e., width from inner edge to outer edge measured in radial direction) of between 2-4 cm, or between 4-6 cm, or between 6-8 cm, or between 8-10 cm, or between 10-12 cm, or between 12-15 cm, or even more. Most typically, it should be appreciated that the rings in a single pipe-in-pipe segment will have identical dimensions, but non-identical dimensions are also deemed suitable for use herein. Still further, it is preferred that each pipe-in-pipe segment will have at least two rings, with each of the rings positioned at the respective ends of the outer pipes, as for example, shown in FIG. 1. Where more than two rings are implemented in contemplated pipe-in-pipe segments it is preferred that the rings will be equidistantly spaced. Likewise, it is typically preferred that the distance between the inner pipe and the outer pipe will be the same as a radial width of the ring. In further preferred aspects, the spacing of the rings will be sufficiently small to allow for transmission of the flexion forces from the outer pipe to the inner pipe, and to minimize or entirely avoid local reductions in the annular space between the inner and the outer tubes. Thus, the rings will also serve as a protective measure to the insulating material between the inner and outer pipes, as even moderate compression of the insulation materials between the outer pipe and the inner pipe may result in a loss of insulation capacity (and with that thermal efficiency). In still further contemplated aspects, the rings may have perforations extending perpendicularly through the ring to maintain stability but to reduce the thermal conductivity path. Additionally, it is contemplated that the shape/profile of the pipes may be modified, for example, by increasing the wall thickness of the outer pipe to improve its performance against compression.

Contemplated sleeves are typically sized and dimensioned such that the sleeve, once installed, will cover the weld joint and joint insulation material, thereby completing an insulation layer between the inner and outer pipes. Of course, and as already noted above, the sleeve will also mechanically couple the outer pipes to each other, and the sleeve will further be mechanically coupled to the rings. To facilitate installation, the sleeve will typically be composed of half-pipes (or smaller portions) with backer bars along longitudinal welds. Therefore, once installed, the outer surface of the sleeve will be continuous with the outer surface of the outer pipes. Viewed from a different perspective, the sleeve will seal the annular space between the inner pipe, the rings, and the outer pipes to so form a continuous pipe-in-pipe system with reduced heat loss and increased mechanical strength.

With regard to suitable insulation materials for the weld joint and the annular space it is contemplated that all insulation materials are deemed appropriate for use herein, including insulating foams, aerogels, mineral/glass fiber mats, etc. As will be readily appreciated, the insulation materials need not be identical between the materials in the annular space in the pipe-in-pipe segments and the space above the weld joint. For example, while the insulation materials in the annular space may be pre-formed and dimensioned as half-pipe foam insets, the joint insulation material may be wrapped around the weld joint from a tape or blanket.

As will be readily appreciated, where such arrangement is used in a geo heat plant, the tubular casing will be subject to heat transfer from the geological formation to the working fluid. In this context, it is noted that the term "geo heat" as used herein refers to a heat resource found in high temperature rock, often at great depths, which can be extracted for industrial power and heat production. Most typically, that heat resource is a 'dry' resource where heat can be extracted without concomitant extraction of a fluid (such as brine from a formation or processed injected water) from the geological formation. For example, the tubular pipe and casing may be part of a closed-loop system in which a working fluid circulates. Most typically, such closed loop system will further comprise a heat exchanger and a turbine and generator to so generate electrical energy as is exemplarily described in U.S. Pat. No. 8,020,382, incorporated by reference herein in its entirety.

In this context, it should be appreciated that closed-loop geothermic technologies aim at collecting (harvesting) heat from hot rock into a working fluid, which circulates within a fully contained environment. Most typically, a closed-loop well comprises a larger casing pipe that is thermally connected to the rock by a thermally conductive grout, and an inner insulated tube to return the heated fluid to the surface. The working fluid flows down through the annular space between the casing and the insulated return tube, gaining heat drawn from the rock through the casing wall, and then flows up the insulated return pipe to supply energy to a multitude of purposes including power generation. Most preferably, the geological formation has a temperature sufficient to convert the liquid working fluid (e.g., water) into a gaseous fluid (e.g., steam) that is transported topside and expanded and cooled in an expansion turbine or fed into a heat exchanger that heats a secondary working fluid of a power generator. Examples of closed-loop geothermic systems are described in U.S. Pat. No. 8,201,409 and US 2018/0274524, incorporated by reference herein in their entirety.

Consequently, the inventors also contemplate a method of installing an insulated return pipe in a geo heat recovery plant in which a plurality of pipe-in-pipe segments are provided and optionally stored for later use. Each of the segments will have an outer pipe enclosing an inner pipe, and each pipe-in-pipe segment will have an insulation material in an annular space between the outer pipe and the inner pipe. At the time of deployment to the thermal well, the pipe-in-pipe segments are successively welded to each other in an end-to-end fashion while being in a horizontal orientation such that (1) respective ends of the inner pipes are welded to each other; (2) respective ends of the outer pipes are welded (or were previously welded) to respective rings on the inner pipes of the pipe segments; (3) a sleeve segment is placed between and welded to the rings of the pipe segments and further welded to the respective ends of the outer pipes to thereby form a continuous outer pipe enclosing the weld connecting the inner pipes. The so joined pipe-in-pipe segments are then advanced (typically using a tensioner) downhole into a geological formation from the horizontal orientation to a vertical orientation. As will be readily appreciated, the so joined pipe-in-pipe segments will be run through a bending device to redirect the joined pipe-in-pipe segments and a straightening device to reverse the bending such that the joined pipe-in-pipe segments are now in a vertical orientation. Of course, it should be appreciated that the joined pipe-in-pipe segments need not necessarily be in a horizontal orientation, but that some angle in the assembly can be implemented. Similarly, where the well is not completely vertical, other angles are also contemplated. In addition, the well may also be curved at some depth, and it is contemplated that the curvature can be accommodated by the joined pipe-in-pipe segments without suffering from a mechanical defect. In still further contemplated aspects, installation of the insulated pipe-in-pipe systems into a casing may be further facilitated by addition of one or more glider pieces, and especially contemplated gliders are described in PCT/US2022/025717, incorporated by reference herein.

Thus, geo heat recovery power plants are also contemplated that include a casing in a geological formation, wherein the casing encloses a pipe-in-pipe system comprising a plurality of serially joined pipe-in-pipe segments, each having an outer pipe enclosing an inner pipe, and each pipe-in-pipe segment having insulation material in an annular space between the outer pipe and the inner pipe. Most typically, the pipe-in-pipe segments are joined as described above, and the casing and the pipe-in-pipe system are then fluidly coupled to each other and a heat exchanger to form a closed loop working fluid circuit for heat recovery and power generation.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An insulated joint in a pipe-in-pipe system in a geothermal energy production plant, comprising:

a first pipe-in-pipe segment and a second pipe-in-pipe segment, each pipe-in-pipe segment having an outer pipe enclosing an inner pipe, and each pipe-in-pipe segment having insulation material in an annular space between the outer pipe and the inner pipe;

wherein each pipe-in-pipe segment has a ring between the outer and inner pipe at which the outer pipe terminates and to which the outer pipe is coupled, and to which the inner pipe is coupled and beyond which the inner pipe extends;

a weld joint between respective ends of the inner pipes of the first and second pipe-in-pipe segments;

first and second half-pipe sleeves coupled to each other via longitudinal welds to form a sleeve segment;

wherein the sleeve segment is welded to the rings of the first and second pipe-in-pipe segments such that (a) the welds at the rings connect the outer pipes of the first and second pipe-in-pipe segments via the sleeve, and (b) the welds at the rings connect the outer pipes of the first and second pipe-in-pipe segments to the respective inner pipes of the first and pipe-in-pipe segments via the rings to so allow for transfer of bending and straightening forces from the outer to the inner pipe; and a joint insulation material between the rings of the first and second pipe-in-pipe segments and between the weld joint and the sleeve.

2. The insulated joint of claim 1, wherein each of the pipe-in-pipe segments have a length of about 10-20 m.

3. The insulated joint of claim 1, wherein the inner pipe of the first and second pipe-in-pipe segments has a diameter of about 10-20 cm and wherein the outer pipe of the first and second pipe-in-pipe segments has a diameter of about 15-25 cm, and wherein the sleeve segment has a length of about 20-50 cm.

4. The insulated joint of claim 1, wherein the ring has a radial width of about 3-10 cm and a thickness of about 2-5 cm, and/or wherein a distance between the inner pipe and the outer pipe is the same as a radial width of the ring.

5. The insulated joint of claim 1, wherein the ring is welded to the inner pipe in each of the first and second pipe-in-pipe segments.

6. The insulated joint of claim 1, wherein the first and/or the second half-pipe sleeve comprise a backer bar along the longitudinal welds.

7. The insulated joint of claim 1, wherein the sleeve segment and the outer pipes of the first and second pipe-in-pipe segments have the same outer diameter, and/or wherein the joint insulation material is wrapped around the weld joint.

8. The insulated joint of claim 1, wherein the welds, the ring, and the sleeve segment of the joined pipe-in-pipe segments have a strength sufficient for a pipe laying process that includes pipe bending and pipe straightening.

9. A method of joining a first pipe-in-pipe segment to a second pipe-in-pipe segment, each pipe-in-pipe segment having an outer pipe enclosing an inner pipe that extends beyond the outer pipe, and each pipe-in-pipe segment having insulation material in an annular space between the outer pipe and the inner pipe for use in a geothermal energy production plant, comprising:

forming a weld joint between respective ends of the inner pipes of the first and second pipe-in-pipe segments;

covering the weld joint with joint insulation material;

welding first and second half-pipe sleeves together via longitudinal welds to form a sleeve segment above the weld joint; and welding the sleeve segment to respective rings on the first and second pipe-in-pipe segments such that (a) the welds at the rings connect the outer pipes of the first and second pipe-in-pipe segments via the sleeve, and (b) the welds at the rings connect the outer pipes of the first and second pipe-in-pipe segments to the respective inner pipes of the first and second pipe-in-pipe segments via the rings to so allow for transfer of bending and straightening forces from the outer to the inner pipe.

10. The method of claim 9, wherein the weld joint is covered by wrapping the joint insulation material about the weld joint.

11. The method of claim 9, wherein the first and second half-pipe sleeves comprise a backer bar along the longitudinal welds.

12. The method of claim 9, wherein the respective rings on the first and second pipe-in-pipe segments are welded to the inner pipe of the first and second pipe-in-pipe segments.

13. The method of claim 9, wherein the sleeve segment and the outer pipes of the first and second pipe-in-pipe segments have the same outer diameter, and/or wherein the sleeve segment and the outer pipes of the first and second pipe-in-pipe segments share a common weld at the respective rings.

14. The method of claim 9, wherein at least 20 pipe-in-pipe segments are serially joined, wherein each of the pipe-in-pipe segments have a length of about 10-20 m, and wherein the sleeve segment has a length of about 20-50 cm.

15. The method of claim 9, wherein the inner pipe of the first and second pipe-in-pipe segments has a diameter of about 10-20 cm and wherein the outer pipe of the first and second pipe-in-pipe segments has a diameter of about 15-25 cm.

16. The method of claim 9, wherein the welds, the ring, and the sleeve segment of the joined pipe-in-pipe segments have a strength sufficient for a pipe laying process that includes pipe bending and pipe straightening.

17. A geothermal energy production plant, comprising:

a casing in a geological formation, wherein the casing encloses a pipe-in-pipe system comprising a plurality of serially joined pipe-in-pipe segments, each having an outer pipe enclosing an inner pipe, and each pipe-in-pipe segment having insulation material in an annular space between the outer pipe and the inner pipe;

wherein the pipe-in-pipe segments are coupled to each other such that (1) respective ends of the inner pipes are welded to each other;

(2) respective ends of the outer pipes are welded to respective rings on the inner pipes of the pipe segments;

(3) a sleeve segment is placed between and welded to the rings of the pipe-in-pipe segments and further welded to the respective ends of the outer pipes to thereby form a continuous outer pipe enclosing the weld connecting the inner pipes and to allow for transfer of bending and straightening forces from the outer to the inner pipe; and wherein the casing and the pipe-in-pipe system are fluidly coupled to each other and a heat exchanger to form a closed loop working fluid circuit for heat recovery and power generation.

18. The plant of claim 17, wherein the geological formation is at a depth of at least 500 m, and/or wherein the geological formation has a temperature of at least 200° C.

19. The plant of claim 17, wherein the serially joined pipe-in-pipe segments have a length of at least 1,000 m.

20. The plant of claim 17, wherein the closed loop working fluid circuit is thermally coupled to an electric generator.

* * * * *